(12) United States Patent
Saito et al.

(10) Patent No.: US 12,205,079 B2
(45) Date of Patent: Jan. 21, 2025

(54) SERVICE SYSTEM

(71) Applicant: Prime Planet Energy & Solutions, Inc., Tokyo (JP)

(72) Inventors: Katsushi Saito, Nagakute (JP); Yuki Ito, Kasugai (JP); Miho Saisho, Kobe (JP); Kiyota Taniguchi, Hyogo-ken (JP); Aya Sato, Nagoya (JP); Masato Koutari, Kakogawa (JP); Hiroshi Tatsumi, Kakogawa (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 201 days.

(21) Appl. No.: 17/823,959

(22) Filed: Sep. 1, 2022

(65) Prior Publication Data
US 2023/0065737 A1 Mar. 2, 2023

(30) Foreign Application Priority Data

Sep. 2, 2021 (JP) .................. 2021-143228

(51) Int. Cl.
*G06Q 50/10* (2012.01)
*B60L 53/60* (2019.01)
(Continued)

(52) U.S. Cl.
CPC .............. *G06Q 10/20* (2013.01); *G06Q 10/02* (2013.01); *G06Q 50/10* (2013.01)

(58) Field of Classification Search
CPC ........ G06Q 10/20; G06Q 10/02; G06Q 50/10; B60L 53/60
See application file for complete search history.

(56) References Cited

U.S. PATENT DOCUMENTS

| | | | |
|---|---|---|---|
| 11,447,024 B1* | 9/2022 | Brannan | G06Q 10/06316 |
| 2019/0126767 A1* | 5/2019 | Sakuma | G08G 1/143 |

(Continued)

FOREIGN PATENT DOCUMENTS

| | | |
|---|---|---|
| JP | 201341324 A | 2/2013 |
| JP | 2014137751 A | 7/2014 |

(Continued)

OTHER PUBLICATIONS

Q. Zhang, D. Shi, G. Cheng, Z. Wang, J. Sun and Y. Wang, "Research on vehicle-to-X electricity trading rules," 2014 9th IEEE Conference on Industrial Electronics and Applications, Hangzhou, China, 2014, pp. 2105-2109, doi: 10.1109/ICIEA.2014.6931518 (Year: 2014).*

*Primary Examiner* — Sarah M Monfeldt
*Assistant Examiner* — Wenren Chen
(74) *Attorney, Agent, or Firm* — HAUPTMAN HAM, LLP

(57) ABSTRACT

A service system includes a reservation section by which a reservation for a commodity or a service in a commercial facility can be made and specific information for an electric vehicle that visits the commercial facility can be set, a connection confirmation section that detects that an electric vehicle corresponding to the specific information set by the reservation section has been connected to a charge and discharge device of the commercial facility, and a notification section that notifies the commercial facility that connection of the electric vehicle corresponding to the specific information to the charge and discharge device has been detected by the connection confirmation section.

6 Claims, 4 Drawing Sheets

(51) Int. Cl.
*G06Q 10/02* (2012.01)
*G06Q 10/20* (2023.01)

(56) References Cited

U.S. PATENT DOCUMENTS

2019/0130449 A1    5/2019   Kaneichi et al.
2024/0086782 A1*   3/2024   Ando ................. G06Q 30/0264

FOREIGN PATENT DOCUMENTS

| JP | 2019-082750 A | | 5/2019 | |
|----|----|----|----|----|
| JP | 2019-168850 A | | 10/2019 | |
| JP | 2020-119320 A | | 8/2020 | |
| JP | 2020-129197 A | | 8/2020 | |
| JP | 2021129459 A | * | 9/2021 | |
| WO | WO-2018145394 A1 | * | 8/2018 | .............. B60L 53/12 |

* cited by examiner

SERVICE SYSTEM

CROSS REFERENCE OF RELATED APPLICATION

The present application claims priority from Japanese Patent Application No. 2021-143228 filed on Sep. 2, 2021, which is incorporated by reference herein in its entirety.

BACKGROUND

The present invention relates to a service system, and more specifically, relates to a service system related to charging and discharging for an electric vehicle and use of a commercial facility.

For example, in Japanese Laid-open Patent Publication No. 2013-41324, an automobile invitation device that invites, in a charging station for electric automobiles, an electric automobile to the charging station is disclosed. In the automobile invitation device, an electric power demand balance is determined to determine a degree of a request for inviting an electric automobile to the charging station. As the degree of the request increases, an incentive acquired when the electric automobile responds to an invitation is increased. Thus, the electric power demand balance can be easily taken.

For example, in Japanese Laid-open Patent Publication No. 2014-137751, an electric power trading system in which a trading charge of electric power is increased and reduced based on a point value set in an advertisement. In this electric power trading system, when a person browses an advertisement in which a point is set, sets an amount of electric power to be traded, and thereafter, charges and discharges an electric vehicle in a parking lot corresponding to the advertisement, a trading charge of electric power is increased and reduced based on the point value set in the advertisement. Japanese Laid-open Patent Publication No. 2014-137751 describes that the electric power trading system activates electric power trade for purpose of obtaining benefits and promotes spread of electric automobiles.

SUMMARY

In the automobile invitation device disclosed in Japanese Laid-open Patent Publication No. 2013-41324 and the electric power trading system disclosed in Japanese Laid-open Patent Publication No. 2014-137751, monetary incentives are provided to users of electric vehicles to promote connection of the electric vehicles to a power system and increase opportunities to incorporate the electric vehicles to the power system. The present application proposes another system that can increase opportunities to incorporate electric vehicles to power systems.

A service system proposed herein includes a reservation section by which a reservation for a commodity or a service in a commercial facility can be made and specific information for an electric vehicle that visits the commercial facility can be set, a connection confirmation section that detects that an electric vehicle corresponding to the specific information set by the reservation section has been connected to a charge and discharge device of the commercial facility, and a notification section that notifies the commercial facility that connection of the electric vehicle corresponding to the specific information to the charge and discharge device has been detected by the connection confirmation section.

According to the service system proposed herein, connection of the electric vehicle associated with the reservation for a commodity or a service to the charge and discharge device of the commercial facility acts as a trigger and the commercial facility can start preparation for the commodity or the service. Thus, convenience from users' viewpoint is increased and connection of the electric vehicle to the charge and discharge device of the commercial facility is promoted. As a result, opportunities to incorporate electric vehicles to an electric power system can be increased.

The service system proposed herein may further include a power storage amount acquisition section that acquires a power storage amount of a battery of the electric vehicle connected to the charge and discharge device of the commercial facility, an information acquisition section that acquires information for a supply and demand condition of electric power, and a charge and discharge command section that commands the charge and discharge device to perform charging or discharging on the electric vehicle, based on the power storage amount of the battery of the electric vehicle acquired by the power storage amount acquisition section and the information acquired by the information acquisition section.

The notification section may be configured to notify the commercial facility of the information that specifies the charge and discharge device to which the electric vehicle corresponding to the specific information has been connected.

The service system proposed herein may further include an execution instruction section that, when connection of the electric vehicle corresponding to the specific information to the charge and discharge device of the commercial facility has been detected by the connection confirmation section, instructs execution of the reservation received by the reservation section. The service system may further include a transmission section that, after connection of the electric vehicle corresponding to the specific information to the charge and discharge device of the commercial facility has been detected, transmits a waiting time for the reserved commodity or service to a user of the electric vehicle. The reservation section may be configured such that, after connection of the electric vehicle corresponding to the specific information to the charge and discharge device of the commercial facility has been detected, an additional order for a commodity or a service can be made.

The service system may further include a pickup device that is provided in the commercial facility and, when connection of the electric vehicle corresponding to the specific information to the charge and discharge device of the commercial facility is detected, collects the reserved commodities to a predetermined collection site.

DETAILED DESCRIPTION

With reference to the attached drawings, a preferred embodiment of a service system disclosed herein will be described below. As a matter of course, the preferred embodiment described herein is not intended to be particularly limiting the present invention. The present invention is not limited to the preferred embodiment described herein, unless specifically stated otherwise. Members/portions that have the same effect will be denoted by the same sign as appropriate and the overlapping description will be omitted as appropriate.

Figure 1:
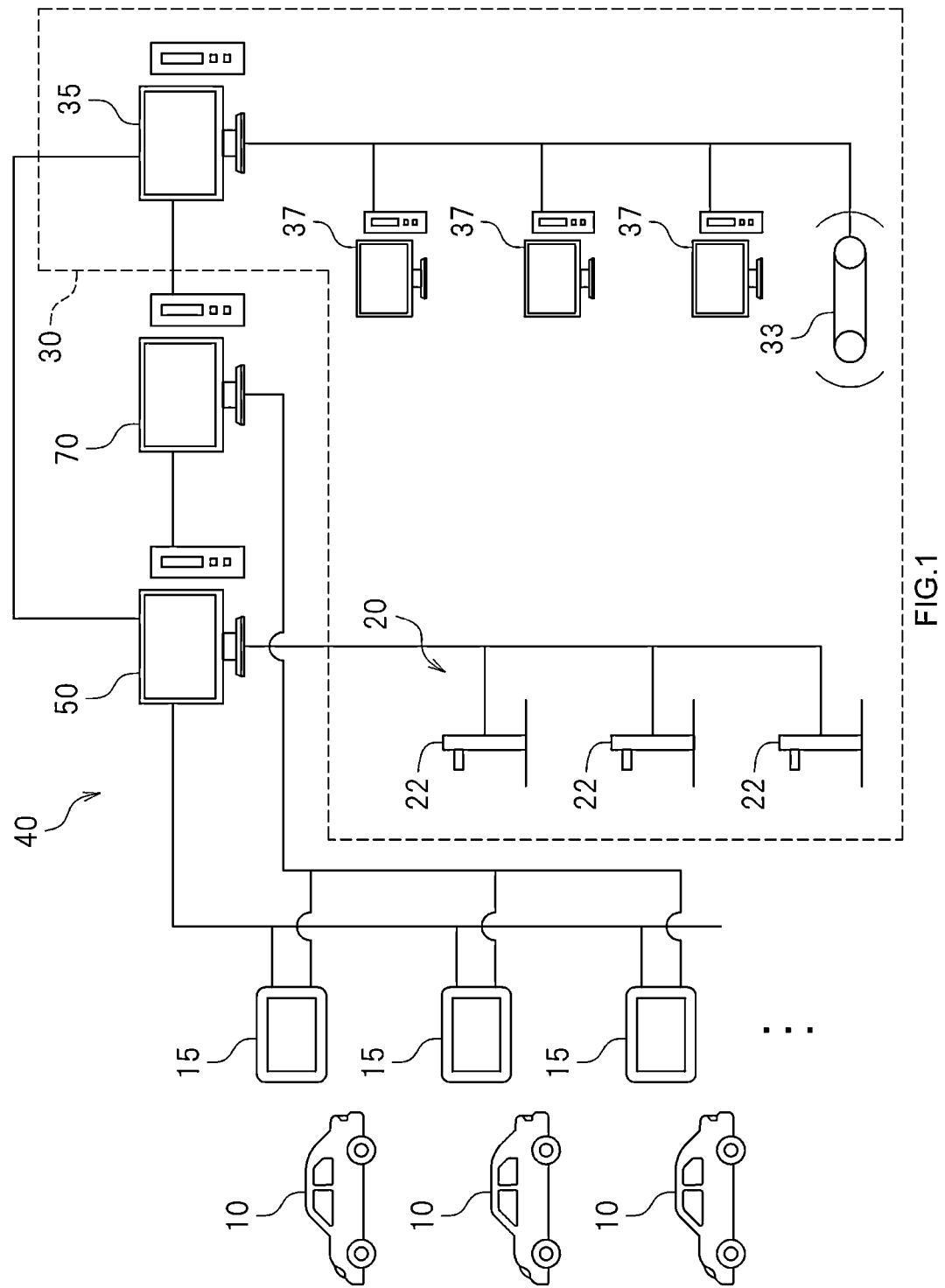
FIG. 1 is a conceptual diagram illustrating a relationship of a service system, an electric vehicle, a terminal of a user, and a charge and discharge device according to a preferred embodiment.

FIG. 1 is a conceptual diagram illustrating a connection relationship of a service system 40 according to this preferred embodiment. As illustrated in FIG. 1, the service system 40 according to this embodiment includes a charge and discharge management system 50 that manages charging or discharging for an electric vehicle 10, a reservation management system 70 that manages a reservation for a commodity or a service in association with charging and discharging for the electric vehicle 10, and a management system 35 of a commercial facility 30 (see FIG. 2 as well). The charge and discharge management system 50, the reservation management system 70, and the management system 35 of the commercial facility 30 are mutually connected and perform management of charging and discharging for the electric vehicle 10 or reservation management for commodities or services while exchanging information.

The charge and discharge management system 50 includes an unillustrated power storage device and manages charging the electric vehicle 10 with electric power stored in the power storage device and storing electric power discharged from the electric vehicle 10 in the power storage device. The electric power stored in the power storage device is sold to a specific company, such as an electric power company or the like. The charge and discharge management system 50 can be used for trading electric power, that is, selling and purchasing electric power.

Herein, what manages the charge and discharge management system 50 is referred to as a system administrator of the charge and discharge management system 50. The system administrator of the charge and discharge management system 50 is also called aggregator. The system administrator of the charge and discharge management system 50 controls a demand amount of electric power to keep a balance between demand and supply of electric power. For example, in response to a request of a specific company, such as an electric power company or the like, the system administrator of the charge and discharge management system 50 procures electric power and supplies electric power to the specific company. Therefore, in order to ensure a necessary amount of electric power, the system administrator of the charge and discharge management system 50 preferably has contracts with as many users of the electric vehicles 10 as possible and as many administrators that manage charge and discharge devices 22 as possible using the charge and discharge management system 50. For example, in the charge and discharge management system 50, one or more users who use or own the electric vehicle 10 are registered and one or more administrators who manage the charge and discharge device 22 that performs charging and discharging on the electric vehicle 10 are registered. In the charge and discharge management system 50, the electric vehicle 10 itself and the charge and discharge device 22 itself may be registered. The charge and discharge management system 50 manages electric power by supplying electric power to the electric vehicle 10 from the charge and discharge device 22 (that is, charging) and supplying electric power to the charge and discharge device 22 from the electric vehicle 10 (that is, discharging).

In this preferred embodiment, examples of the electric vehicle 10 include vehicles, such as an electric automobile, a hybrid electric vehicle, a plug-in hybrid electric vehicle, or the like, that uses electric power as an energy source. The electric vehicle 10 may be a four-wheel vehicle and may be a two-wheel vehicle. Herein, one or more charge and discharge management devices 22 are installed in a charge and discharge spot 20. There is no particular limitation on the number of charge and discharge management devices 22 installed in one charge and discharge spot 20. One charge and discharge spot 20 is managed by a predetermined administrator. The charge and discharge spot 20 can be a parking lot in which the charge and discharge management device 22 is installed. Examples of the parking lot include a parking lot of a commercial facility, a parking of a housing, or the like. Herein, a case where the charge and discharge spot 20 is a charge and discharge spot provided in a commercial facility that provides commodities or services to customers will be described. As used herein, the term "commercial facility" means a facility including one or more stores or facilities that can provide commodities or services to customers, whether a manned facility or an unmanned facility. Commodities or services may include free commodities or services.

Figure 2:
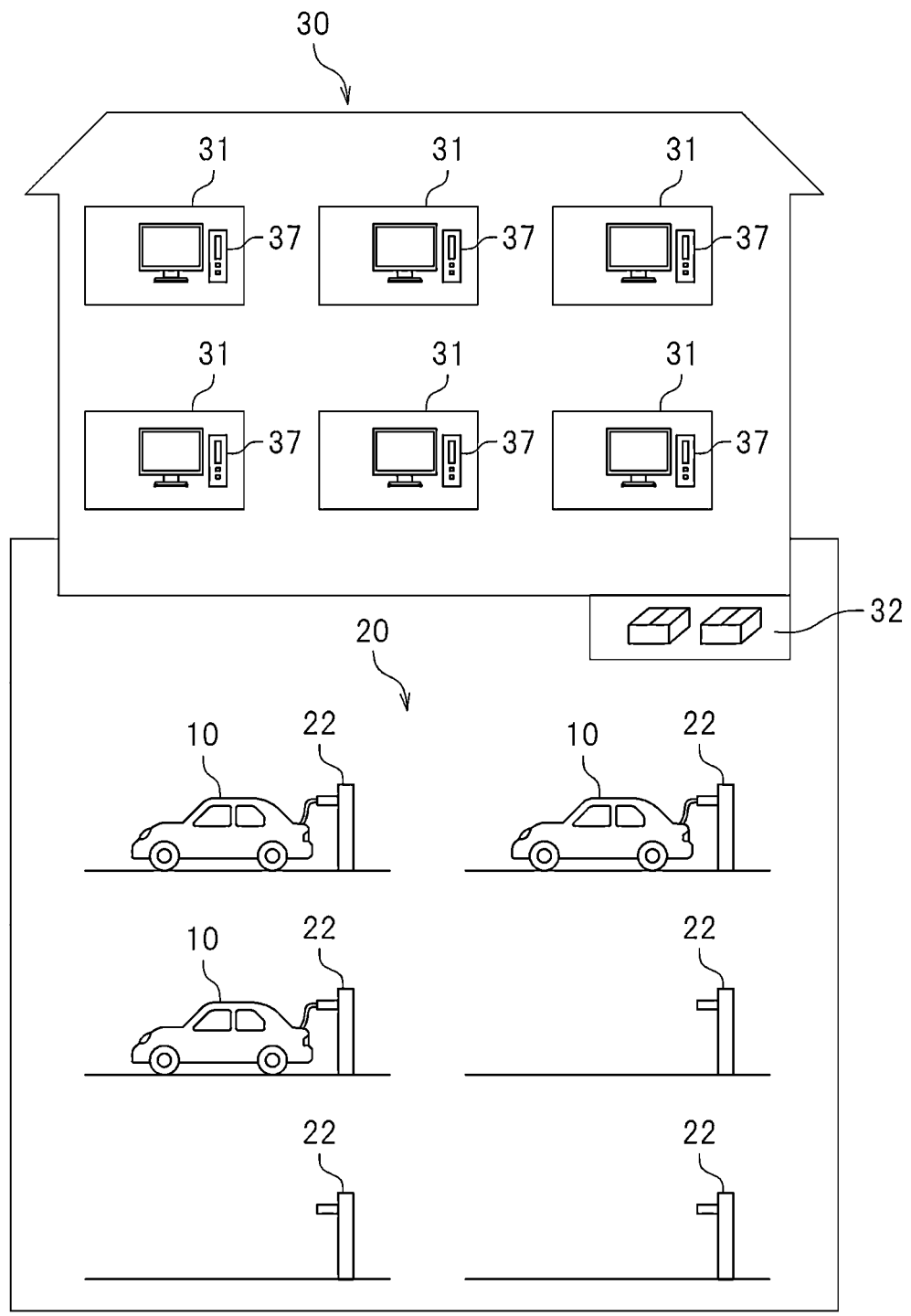
FIG. 2 is a conceptual diagram illustrating an example of a commercial facility.

FIG. 2 is a conceptual diagram illustrating an example of the commercial facility 30. As illustrated in FIG. 2, a plurality of stores 31 each of which provides commodities or services are provided in the commercial facility 30 of the example. The commercial facility 30 is, for example, a shopping mall. In the commercial facility 30, a parking lot where a vehicle that has arrived at the commercial facility is parked is provided. At least a part of the parking lot includes the one or more charge and discharge devices 22 and is the charge and discharge spot 20 where charging and discharging can be performed on the electric vehicle 10 visiting the commercial facility 30. A user who has visited the commercial facility 30 by the electric vehicle 10 can use the stores 31 or the like and can perform charging and discharging of the electric vehicle 10 by any one of the one or more charge and discharge devices 22.

In the reservation management system 70, purchase of a commodity or providing a service in the commercial facility 30 can be reserved. In this preferred embodiment, a connection of the electric vehicle 10 to the charge and discharge device 22 is associated with a reservation for a commodity or a service by the reservation management system 70. Herein, the reservation management system 70 manages not only a reservation action for a commodity or a service but also all tasks (for example, ordering of a commodity, transporting, related services, or the like) related to a commodity or a service that can be reserved.

A system administrator of the reservation management system 70 may be an administrator of the commercial facility 30. The administrator of the commercial facility 30 can be, typically, an administrator of the charge and discharge spot 20. The administrator of the commercial facility 30 in this case (the system administrator of the reservation management system 70) exchanges information between the reservation management system 70 and the charge and discharge management system 50, and may make a contract concerning money transfer with the administrator of the charge and discharge management system 50 as necessary. A plurality of reservation management systems 70 may be connected to the charge and discharge management system 50, and the service system 40 may include the charge and discharge management system 50, the plurality of reservation management systems 70, and the plurality of management systems 35 of the commercial facility 30.

In another form, the system administrator of the reservation management system 70 may be the administrator of the charge and discharge management system 50. In that case, the charge and discharge management system 50 and the reservation management system 70 may be operated by a single system. In this form, the system administrator of the charge and discharge management system 50 and the reservation management system 70 may make a contract with the administrator of the commercial facility 30 (and further with the administrator of the charge and discharge spot 20 in a case where the administrator of the charge and discharge spot 20 is different from the administrator of the commercial facility 30). As another alternative, the administrator of the reservation management system 70 may be some other system administrator who has made a contract with the administrator of the charge and discharge management system 50 and the administrator of the commercial facility 30.

FIG. 1 illustrates a case where the administrator of the charge and discharge management system 50, the administrator of the reservation management system 70, and the administrator of the commercial facility 30 are all different administrators. As illustrated in FIG. 1, the administrator of the commercial facility 30 manages the management system 35 of the commercial facility 30. The management system 35 of the commercial facility 30 is connected to the charge and discharge management system 50 and the reservation management system 70. The charge and discharge management system 50 and the reservation management system 70 may be connected to respective management systems 35 of a plurality of commercial facilities 30. Each of the charge and discharge management system 50, the reservation management system 70, and the management system 35 of the commercial facility 30 may be realized, for example, by a server of a client-server system. Each of the charge and discharge management system 50, the reservation management system 70, and the management system 35 of the commercial facility 30 may be realized by cloud computing. As illustrated in FIG. 1, the charge and discharge management system 50 is communicably connected to a terminal 15 of a user using the electric vehicle 10 and the charge and discharge device 22 installed in the charge and discharge spot 20. The reservation management system 70 is communicably connected to terminals of customers including the terminal 15 of the user who uses the electric vehicle 10. The management system 35 of the commercial facility 30 is connected to a plurality of terminals 37 used by employees of the commercial facility 30 or the stores 31 therein (which will be hereinafter referred to as the terminals 37 of the stores 31). There is a probability that systems, terminals, or devices that are not directly connected to each other in the example of FIG. 1 are directly connected.

The service system 40 according to this preferred embodiment is configured to provide a special service to the user of the electric vehicle 10 when, after making a reservation for a commodity or the like by the reservation management system 70, the user visits the commercial facility 30 using the set electric vehicle 10 and connects the electric vehicle 10 to the charge and discharge device 22 of the commercial facility 30. Alternatively, in a case described above, the service system 40 instructs an employee of the commercial facility 30 or the like to provide a special service. Thus, convenience for the user is increased and connection of the electric vehicle 10 to the charge and discharge device 22 of the commercial facility 30 is promoted. As a result, opportunities to incorporate the electric vehicle 10 to an electric power system can be increased. For the commercial facility 30, an increase in the number of customers who use the commercial facility 30 can be expected.

Figure 3:
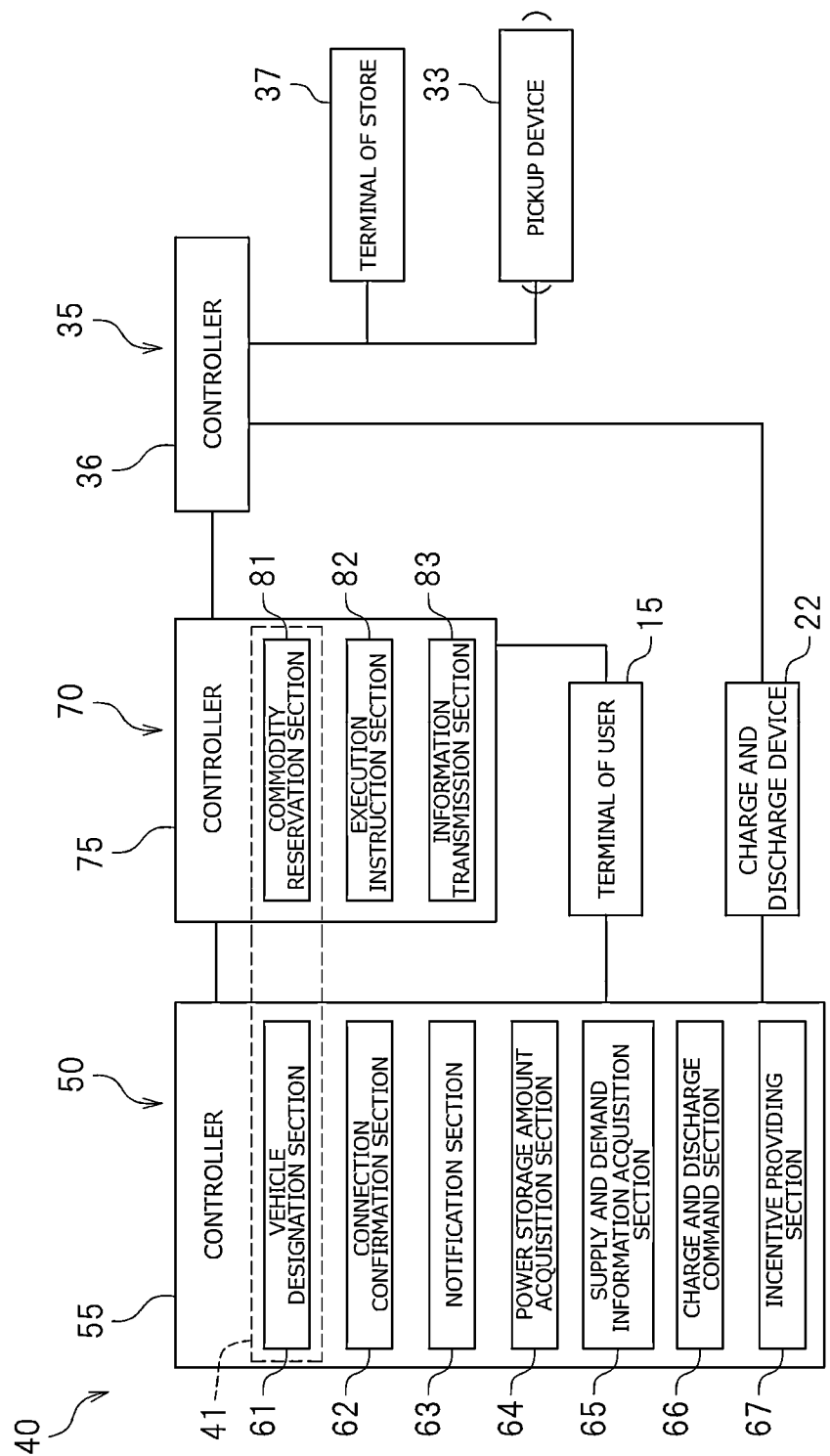
FIG. 3 is a block diagram illustrating the service system, the terminal of the user, and the charge and discharge device according to the preferred embodiment.

FIG. 3 is a block diagram illustrating the service system 40 or the like. As illustrated in FIG. 3, the charge and discharge management system 50 includes a controller 55. There is no particular limitation on a configuration of the controller 55. Herein, the controller 55 is, for example, a microcomputer. The controller 55 includes, for example, an I/F, a CPU, a ROM, and a RAM. The charge and discharge management system 50 may be realized by a single computer and may be realized by a plurality of computers in cooperation. Each of the reservation management system 70 and the management system 35 of the commercial facility 30 includes corresponding one of similar controllers 75 and 36.

The terminal 15 of the user may be, for example, a car navigation system mounted on the electric vehicle 10 and may be a smartphone, a tablet terminal, or a desktop-type or laptop-type personal computer used by the user. Each of the terminals 37 of the stores 31 may be, for example, a smartphone, a tablet terminal, or a desktop-type or laptop-type personal computer.

As illustrated in FIG. 3, the controller 55 of the charge and discharge management system 50 includes a vehicle designation section 61, a connection confirmation section 62, a notification section 63, a power storage amount acquisition section 64, a supply and demand information acquisition section 65, a charge and discharge command section 66, and an incentive providing section 67. The controller 75 of the reservation management system 70 includes a commodity reservation section 81, an execution instruction section 82, and an information transmission section 83. Although not illustrated, the controller 36 of the commercial facility 30 includes, for example, a processing section that performs ordering processing for a commodity or the like in cooperation with the reservation management system 70, a processing section that performs inventory management, a processing section that issues an instruction to any one of the terminals 37 of the stores 31 and transmits information, a processing section that acquires information that has been input to any one of the terminals 37 of the stores 31, or the like.

The commodity reservation section 81 of the reservation management system 70 and the vehicle designation section 61 of the charge and discharge management system 50 form a reservation section 41 by which a commodity or a service in the commercial facility 30 can be reserved and specific information of the electric vehicle 10 that visits the commercial facility 30 can be set. The commodity reservation section 81 of the reservation management system 70 is configured or programmed to receive reservations for commodities or services from customers. In a case where a reserved commodity or service is received in the commercial facility 30 and, a customer who made a reservation order intends to visit the commercial facility 30 by the electric vehicle 10, the customer can set specific information of the electric vehicle 10 using the vehicle designation section 61 of the charge and discharge management system 50. The specific information of the electric vehicle 10 may be, for example, identification information of the electric vehicle 10 itself that is stored in the electric vehicle 10 and is read by connecting the electric vehicle 10 to the charge and discharge device 22. As another alternative, the specific information of the electric vehicle 10 may be, for example, specific information that is created by the vehicle designation section 61 and is notified to the customer. There is no particular limitation on a format of the specific information of the electric vehicle 10. An example of the specific information of the electric vehicle 10 will be given in an example that will be described later.

The connection confirmation section 62 of the charge and discharge management system 50 is configured or programmed to detect that the electric vehicle 10 corresponding to specific information set by the vehicle designation section 61 has been connected to one of the charge and discharge devices 22 of the commercial facility 30. The connection confirmation section 62 detects that the electric vehicle 10 corresponding to the specific information has been connected to the charge and discharge device 22 of the commercial facility 30 by communicating with the charge and discharge device 22. At this time, the connection confirmation section 62 also detects to which charge and discharge devices 22 of the commercial facility 30 the electric vehicle 10 has been connected.

The notification section 63 is configured or programmed to notify the commercial facility 30 that connection of the electric vehicle 10 corresponding to the specific information to the charge and discharge device 22 has been detected by the connection confirmation section 62. Herein, the notification section 63 notifies the management system 35 of the commercial facility 30 of the connection of the electric vehicle 10 to the charge and discharge device 22 via the reservation management system 70. The management system 35 of the commercial facility 30 transmits this information to one or more of the terminals 37 of the stores 31 related to the reservation. However, a route via which the connection of the electric vehicle 10 to the charge and discharge device 22 is notified is not limited to a route via the reservation management system 70. For example, the notification section 63 may be configured or programmed to directly notify the management system 35 of the commercial facility 30 of the connection of the electric vehicle 10 to the charge and discharge device 22. The notification section 63 is also configured or programmed to notify the commercial facility 30 of information that specifies the charge and discharge device 22 to which the electric vehicle 10 corresponding to the specific information is connected (to which charge and discharge devices 22 of the commercial facility 30 the electric vehicle 10 has been connected). In other words, the notification section 63 notifies the commercial facility 30 of arrival of the customer at the commercial facility 30 and a parking location of the electric vehicle 10 of the customer.

When it is detected by the connection confirmation section 62 that the electric vehicle 10 corresponding to the specific information has been connected to the charge and discharge device 22 of the commercial facility 30, the execution instruction section 82 of the reservation management system 70 instructs execution of the reservation received by the reservation section 41 (specifically, the commodity reservation section 81). In this embodiment, connection of the electric vehicle 10 to the charge and discharge device 22 of the commercial facility 30 (that is, evidence of arrival of the customer at the commercial facility 30) acts as a trigger to start preparation of the reserved commodity or service.

The reservation section 41 is configured or programmed to enable an additional order for a commodity or a service after it is detected that the electric vehicle 10 corresponding to the specific information has been connected to the charge and discharge device 22 of the commercial facility 30. The additional order enables the customer to add a commodity that the customer takes home to the reservation order on a spot using a condition where it is clearly known that the customer is in the commercial facility 30.

After connection of the electric vehicle 10 corresponding to the specific information to the charge and discharge device 22 of the commercial facility 30 has been detected, the information transmission section 83 of the reservation management system 70 transmits a waiting time for the reserved commodity or service to the user of the electric vehicle 10. This information transmission is a service in consideration that there are commodities or services for which a time is required to prepare for providing the commodities or services.

In a case where the electric vehicle 10 for which a setting or a contact that permits automatic charging and discharging for supply and demand adjustment for electric power (including a permission with a time limit when the electric vehicle 10 is connected to the charge and discharge device 22) has been made is connected to the charge and discharge device 22 of the commercial facility 30, the charge and discharge management system 50 performs automatic charging and discharging on the electric vehicle 10 as necessary. The power storage amount acquisition section 64 of the charge and discharge management system 50 is configured or programmed to acquire a power storage amount of a battery of the electric vehicle 10 connected to the charge and discharge device 22 of the commercial facility 30. The supply and demand information acquisition section 65 acquires information for a supply and demand condition of electric power. A charge and discharge command section 66 is configured or programmed to command the charge and discharge device 22 to perform charging or discharging on the electric vehicle 10, based on the power storage amount of the battery of the electric vehicle 10 acquired by the power storage amount acquisition section 64 and the information acquired by the supply and demand information acquisition section 65.

An incentive providing section 67 is configured or programmed to provide an incentive to a user who has connected the electric vehicle 10 to the charge and discharge device 22 of the commercial facility 30 and has performed charging and discharging. The incentive may be provided to the user who has performed charging and discharging of the electric vehicle 10 corresponding to the specific information and may be provided to all users who have performed charging and discharging by the charge and discharge devices 22 of the commercial facility 30. There may be a difference in an incentive rate between the user who has performed charging and discharging of the electric vehicle 10 corresponding to the specific information and other users who have performed charging and discharging by the charge and discharge devices 22 of the commercial facility 30.

An incentive is a reward given to a user and is a privilege given to the user. There is no particular limitation on a specific type of the incentive. For example, the incentive may be a point, a coupon, a complementary ticket, acquisition of a commodity, discount of an electricity fee, or the like. The point may be a point that can be used for payment for charging the electric vehicle 10. The point may be a point that can be used when payment to the commercial facility 30 is made. The point may be a point that can be exchanged for a commodity, such as a special local product or the like. The coupon may be a discount coupon that can be used for charging the electric vehicle 10 and may be a coupon that can be used for adding an extra charge to payment given to the user for discharging electric power from the electric vehicle 10. The coupon may be a coupon that can be used for receiving a discount for fees that the user pays to the commercial facility 30. The coupon may be a paper coupon and may be an electronic coupon. The complementary ticket is a ticket that can be used for receiving, for example, in a case where the store 31 of the commercial facility 30 provides a service, such a privilege that allows the user to make a preferential reservation for the service, to skip an order of waiting, or the like.

Figure 4:
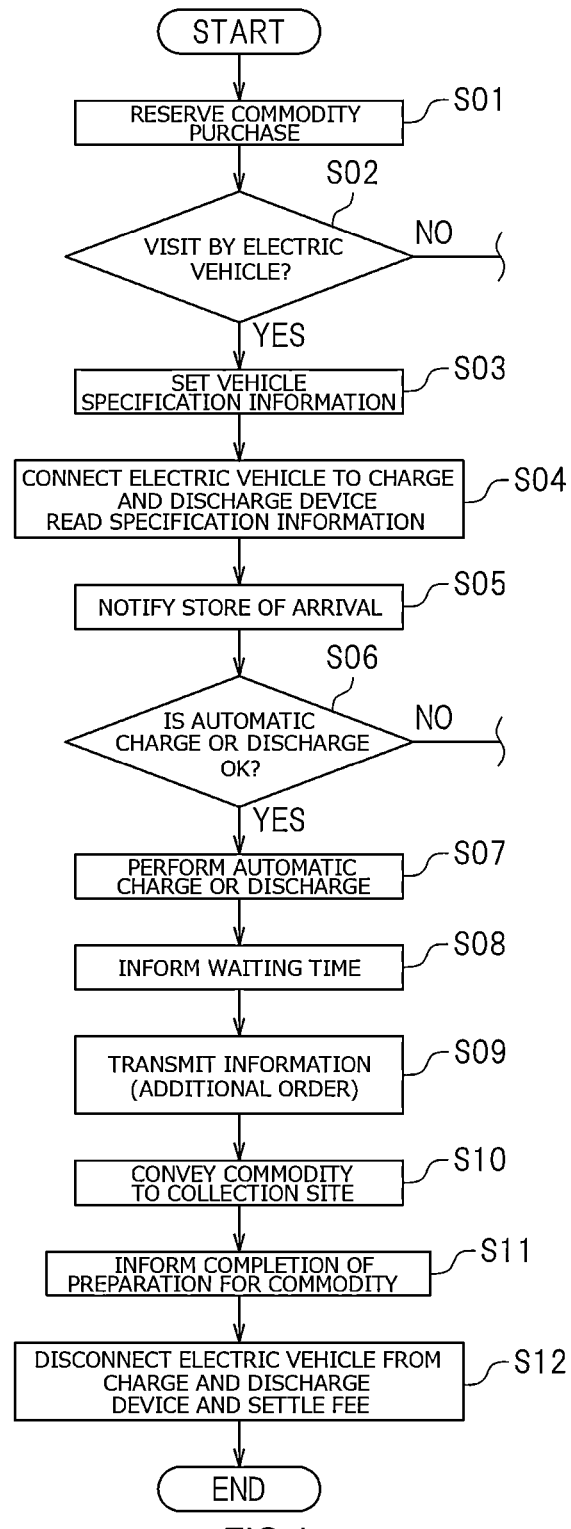
FIG. 4 is a flowchart illustrating a flow from reservation for a commodity to settlement of a charging and discharging charge.

A flow in which a user reserves a commodity or the like by the reservation management system 70 and the user receives a special service in the commercial facility 30 will be described below using a flowchart. FIG. 4 is a flowchart illustrating a flow from reservation for a commodity by the reservation management system 70 to settlement of a charging and discharging charge. As illustrated in FIG. 4, in the flowchart of this example, in Step S01, a purchase of a plurality of commodities is reserved using the reservation management system 70 (including a case where payment is made at this time and the commodities will be received later). This reservation operation is performed using the terminal 15 of the user. Herein, a case where the plurality of commodities are dealt with in different stores 31 in the commercial facility 30 is assumed. It is also assumed that reception date and time are not specifically specified.

In the reservation management system 70, it can be selected to visit the commercial facility 30 to receive the commodities. Although not illustrated in FIG. 4, if it is selected to visit the commercial facility 30 to receive the commodities in Step S01, in Step S02, the charge and discharge management system 50 asks the customer whether the customer will visit the commercial facility 30 by the electric vehicle 10.

In Step S02, the customer selects whether the customer will visit the commercial facility 30 by the electric vehicle 10. If, in Step S02, the customer selects not to visit the commercial facility 30 by the electric vehicle 10 (if a result of Step S02 is NO), description of a subsequent flow will be omitted. If, in Step S02, the customer selects to visit the commercial facility 30 by the electric vehicle 10 (if the result of Step S02 is YES), in Step S03, specific information of the electric vehicle 10 is set. At a time of Step S02, for example, a notice that the customer can receive a privilege if the customer visits the commercial facility 30 by the electric vehicle 10 and connects the electric vehicle 10 to the charge and discharge device 22 may be displayed on a screen of the terminal 15 of the user. The notice may be, for example, a notice that a waiting time can be reduced because the store 31 is informed of arrival of customer to the commercial facility 30 when the customer connects the electric vehicle 10 to the charge and discharge device 22. The notice may be, for example, a notice that an incentive is provided by charging and discharging.

In Step S03, for example, a bar code is transmitted to the terminal 15 of the user from the charge and discharge management system 50. By connecting the electric vehicle 10 to the charge and discharge device 22 of the commercial facility 30 and causing the charge and discharge device 22 to read the bar code, it is confirmed by the service system 40 that the customer who made this reservation has arrived at the commercial facility 30. However, as described above, specification of the electric vehicle 10 by the bar code is merely an example of a method for specifying the electric vehicle 10. For example, in Step S03, the identification information of the electric vehicle 10 stored in the terminal 15 of the user may be transmitted to the charge and discharge management system 50.

In Step S04, the customer who made the reservation (the user of the electric vehicle 10) visits the commercial facility 30 and connects the electric vehicle 10 to one of the charge and discharge devices 22. Moreover, in Step S04, an operation of causing the charge and discharge management system 50 to specify the electric vehicle 10 (herein, an operation of causing the charge and discharge device 22 to read the bar code) is performed. However, in consideration of increase in convenience and operation forgetting prevention, and furthermore, existence of the terminal 15 that cannot be carried and a measure against forgetting to carry the terminal 15, for example, it is preferable that the specific information of the electric vehicle 10 stored in the electric vehicle 10 is automatically read by connecting the electric vehicle 10 to the charge and discharge device 22.

In Step S05, the stores 31 that deal with the commodities are notified that the electric vehicle 10 related to the reservation for the commodities has been connected to the charge and discharge device 22. In this example, the number of the stores 31 is a plural number. By this notification, although the user did not specify the reception date and time, each of the plurality of stores 31 can start preparation for delivery of a corresponding one of the commodities. In this preferred embodiment, when connection of the electric vehicle 10 corresponding to the specific information to the charge and discharge device 22 of the commercial facility 30 is detected, the reservation management system 70 instructs execution of the reservation received by the reservation section 41.

In Step S06, the charge and discharge management system 50 requests a permission for performing automatic charging or discharging for supply or demand adjustment for electric power while the electric vehicle 10 is connected to the charge and discharge device 22 of the commercial facility 30 to the user. At this time, a charging unit price or a discharge unit price including an incentive may be indicated to the user. If automatic charging or discharging is permitted in Step S06 (if a result of Step S06 is YES), in Step S07, charging or discharging of the electric vehicle 10 is performed as necessary. If automatic charging and discharging is not permitted in Step S06 (if the result of Step S06 is NO), the user can select one of charging, discharging, or neither charging nor discharging, but illustration thereof is omitted.

In Step S08, a waiting time to completion of preparation for the commodities is informed to the terminal 15 of the user. The waiting time may be a preparation time preset for each commodity, and may be a waiting time that has been input to the terminal 37 of a corresponding one of the stores 31 by a person in charge at the store 37 after the person learned arrival of the user. For example, in a case where the user has purchased food stuffs, such as meat, fish, or the like, there can be a case where it takes time to cut or wrap meat, fish, or the like. The waiting time includes a conveyance time to convey the commodities to a collection site 32 (see FIG. 2) that will be described later. The user of the electric vehicle 10 can do, for example, shopping for other commodities during the waiting time. The waiting time displayed on the terminal 15 of the user may be updated with passage of time.

In Step S09, useful information for customers who are in the commercial facility 30 is transmitted to the terminal 15 of the user. The information is, for example, a vacant seat condition of a restaurant or the like. In this preferred embodiment, in the reservation section 41, after it is detected that the electric vehicle 10 corresponding to the specific information has been connected to the charge and discharge device 22 of the commercial facility 30, an additional order for a commodity or a service can be made. The user can, for example, make a reservation for a nearest time slot at a restaurant using an advantage that the user is already in the commercial facility 30. In a case where the user has additionally ordered a commodity, the commodity is conveyed to the collection site 32. The user can take the additionally ordered commodity home with the commodities ordered before visiting the commercial facility 30.

In Step S10, the prepared commodities are conveyed from the plurality of stores 31 to the collection site 32 (see FIG. 2). Conveyance of the commodities is performed, for example, by the employees of the stores 31 or the commercial facility 30. Thus, the commodities are collected at one site. The customer can receive the commodities without touring the plurality of stores 31. The collection site 32 is preferably provided in a location near the charge and discharge spot 20. A plurality of collection sites 32 may be provided. The charge and discharge spot 20 where the customer parked the electric vehicle 10 is grasped by the charge and discharge management system 50. Therefore, it is possible to select the collection site 32 nearest to the charge and discharge spot 20 as the collection site 32 at which the customer receives the commodities. The collection site 32 may be provided in midway to an exit from the charge and discharge spot 20 and the customer can go to the collection site 32 by the electric vehicle 10.

As an option in Step S10, the employees of the stores 31 or the commercial facility 30 may take the commodities to the electric vehicle 10 of the customer. In a case where the commodities are heavy articles or in a case where the customer has a difficulty for taking the commodities from the collection site 32 to the charge and discharge spot 20, this service is convenient. The service system 40 may have a function of adding the above-described option.

In Step S11, it is informed to the terminal 15 of the user that preparation for the commodities is completed. Illustration of reception of the commodities by user is omitted. In Step S12, the electric vehicle 10 is disconnected from the charge and discharge device 22 and a charging or discharging fee is settled. The settled charging or discharging fee may be paid or received later. In a case where the collection site 32 is configured such that the user can go to the collection site 32 by the electric vehicle 10, the user may receive the commodities after Step S12.

As described above, the service system 40 according to this preferred embodiment includes the reservation section 41 by which a commodity or a service in the commercial facility 30 can be made and specific information of the electric vehicle 10 that visits the commercial facility 30 can be set, the connection confirmation section 62 that detects that the electric vehicle 10 corresponding to the specific information set by the reservation section 41 has been connected to the charge and discharge device 22 of the commercial facility 30, and the notification section 63 that notifies the commercial facility 30 that connection of the electric vehicle 10 corresponding to the specific information to the charge and discharge device 22 has been detected by the connection confirmation section 62. According to the service system 40, connection of the electric vehicle 10 associated with a reservation for the commodity or the service to the charge and discharge device 22 of the commercial facility 30 acts as a trigger, and the commercial facility 30 can start preparation for the commodity or the service. Thus, the commodity or the service can be quickly provided even when the user visits the commercial facility 30 at an indefinite date and time, and convenience from customer's viewpoint is increased. As a result, it is expected that users of the commercial facility 30 increases. Knowing arrival of a customer has such an advantage for the stores 31 or the like of the commercial facility 30 that the stores 31 can know a timing of starting preparation for a commodity or a service and can easily perform personnel management. For the administrator of the charge and discharge management system 50, promotion of connection of the electric vehicle 10 to the charge and discharge device 22 of the commercial facility 30 can be expected. As a result, opportunities to incorporate the electric vehicle 10 to a power system can be increased. Increase in convenience is for example as illustrated in the flowchart of FIG. 4.

In this embodiment, the service system 40 includes the power storage amount acquisition section 64 that acquires the power storage amount of the battery of the electric vehicle 10 connected to the charge and discharge device 22 of the commercial facility 30, the supply and demand information acquisition section 65 that acquires information for the supply and demand condition of electric power, and the charge and discharge command section 66 that commands the charge and discharge device 22 to perform charging or discharging on the electric vehicle 10, based on the power storage amount of the battery of the electric vehicle 10 acquired by the power storage amount acquisition section 64 and the information acquired by the supply and demand information acquisition section 65. According to the service system 40, the service system 40 can grasp whether charging to the electric vehicle 10 or discharging from the electric vehicle 10 is possible and an amount of electric power that can be charged or discharged. Furthermore, whether discharging from the electric vehicle 10 is to be performed or charging to the electric vehicle 10 is to be performed can be determined by acquiring information for the supply and demand condition of electric power by the service system 40. The service system 40 automatically performs charging or discharging on the electric vehicle 10, based on the power storage amount of the battery of the electric vehicle 10 and the information for the supply and demand condition of electric power, if automatic charging or discharging is permitted. Therefore, supply and demand adjustment for the electric power system is facilitated.

The notification section 63 is configured to notify the commercial facility 30 of information that specifies the charge and discharge device 22 to which the electric vehicle 10 corresponding to the specific information is connected. According to a structure described above, the commercial facility 30 can specify a location of the electric vehicle 10 of the customer. Therefore, for example, a nearest collection site 32 can be selected, a commodify can be delivered to the electric vehicle 10, or like service is enabled.

The service system 40 according to this embodiment includes the execution instruction section 82 that, when it is detected by the connection confirmation section 62 that the electric vehicle 10 corresponding to the specific information has been connected to the charge and discharge device 22 of the commercial facility 30, instructs execution of a reservation received by the reservation section 41. Thus, the employees of the commercial facility 30 or the stores 31 know what to do and an operation that is automatically performed is automatically started. Therefore, preparation for the commodity or the service is performed without confusion or delay. In the service system 40, providing instruction of execution of a reservation by the execution instruction section 82 may be a condition for execution of the reservation. However, this condition may be cancelable.

In this preferred embodiment, the service system 40 includes the information transmission section 83 that, after it is detected that the electric vehicle 10 corresponding to the specific information has been connected to the charge and discharge device 22 of the commercial facility 30, transmits a waiting time for the reserved commodity or service to the user of the electric vehicle 10. Thus, the user knows the waiting time, and therefore, can make better use of the waiting time.

In this preferred embodiment, the reservation section 41 is configured such that, after it is detected that the electric vehicle 10 corresponding to the specific information has been connected to the charge and discharge device 22 of the commercial facility 30, an additional order for a commodity or a service can be made by the reservation section 41. Thus, as described above, the user can take the additionally ordered commodity home with the commodities reserved before visiting the commercial facility 30. Moreover, the user can receive the additionally ordered service on the spot.

The service system 40 may further include a pickup device 33 (illustrated as in parentheses in FIG. 1 and FIG. 3) that is provided in the commercial facility 30 and, when it is detected that the electric vehicle 10 corresponding to the specific information has been connected to the charge and discharge device 22 of the commercial facility 30, collects the reserved commodities to a predetermined collection site 32. With the pickup device 33 provided, manpower required for collecting the commodities to the collection site 32 can be reduced. The pickup device 33 may include, for example, an automated warehouse and a conveyance device. However, there is no particular limitation on a configuration of the pickup device 33.

One preferred embodiment of the present invention has been described above. However, the present invention can be implemented by some other embodiment. For example, a service system may be configured to enable ordering a commodity to not only a commercial facility but also a commodity producer or a wholesaler. In the system, a customer may be able to specify a commodify pickup location to a commercial facility. As used herein, the "commercial facility" is not limited to a facility where a commodity related to a reservation is dealt with but may be a facility that includes a charging and discharging spot and is open to public. For the commercial facility, there can be a case where, even when a user visits the commercial facility for some other purpose than using the commercial facility, a secondary benefit can be gained. The service system may be configured such that a customer connects an electric vehicle to a charging and discharging device of the commercial facility, so that the customer can proceed to a stage where the customer receives the commodity. An incentive provided to the customer may be added by a supplier of the commodity by connecting the electric vehicle to the charging and discharging device of the commercial facility.

A reservation for a commodity may be automatically made. For example, artificial intelligence (AI) predicts a commodity (for example, food) necessary for the customer and orders the commodity to the service system. For example, in a case of automatic order for food, a camera connected to AI or the like may be provided in a refrigerator of the customer. The electric vehicle may be an automatic driven vehicle. When the customer orders a commodity, a commercial facility that is a pickup location may be automatically selected and the electric vehicle that is automatically driven may transport the customer to the selected commercial facility.

What is claimed is:

1. A service system comprising:
a charge and discharge device configured to charge and discharge a battery of an electric vehicle; and
a server connected to the charge and discharge device, wherein the server is configured to:
reserve a commodity or a service in a commercial facility and set specific information for the electric vehicle that visits the commercial facility, wherein the commodity or service is different from charging and discharging the electric vehicle, and the server is configured to perform the reservation without a specification of reception date and time;
connect the electric vehicle to the charge and discharge device to charge or discharge the battery of the electric vehicle, and to read the specific information of the electric vehicle;
detect that the electric vehicle corresponding to the specific information has been connected to the charge and discharge device of the commercial facility; and
notify a department of the commercial facility dealing with the commodity or the service related to the reservation that connection of the electric vehicle corresponding to the specific information to the charge and discharge device has been detected.

2. The service system according to claim 1, wherein the server is configured to notify the department of the commercial facility dealing with the commodity or the service related to the reservation of the information that specifies the charge and discharge device to which the electric vehicle corresponding to the specific information has been connected.

3. The service system according to claim 1, the server is further configured to:
when connection of the electric vehicle corresponding to the specific information to the charge and discharge device of the commercial facility has been detected, instruct execution of the reservation to the department of the commercial facility dealing with the commodity or the service related to the reservation.

4. The service system according to claim 1, wherein the server is configured to:
after connection of the electric vehicle corresponding to the specific information to the charge and discharge device of the commercial facility has been detected, transmit a waiting time for the reserved commodity or service to a user of the electric vehicle.

5. The service system according to claim 1, wherein the server is configured such that, after connection of the electric vehicle corresponding to the specific information to the charge and discharge device of the commercial facility has been detected, an additional order for a commodity or a service can be made.

6. The service system according to claim 1, further comprising:
a pickup device that is provided in the commercial facility and, when connection of the electric vehicle corresponding to the specific information to the charge and discharge device of the commercial facility is detected, collects the reserved commodities to a predetermined collection site.

* * * * *